(No Model.)
C. F. WATKINS.
BICYCLE.
No. 448,701. Patented Mar. 24, 1891.
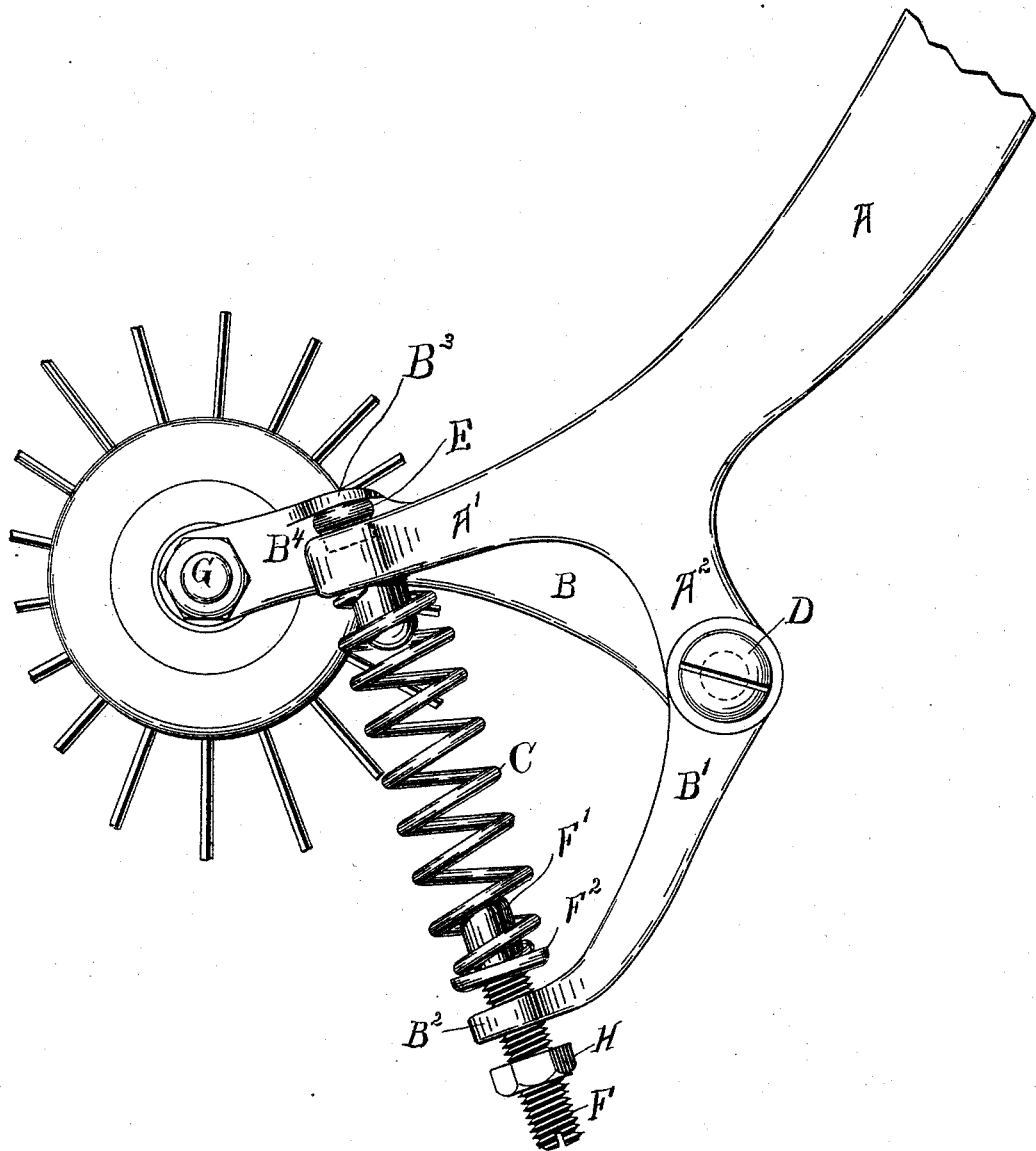
WITNESSES:
Otto E. Hoddick.
Charles R. Edwards.
INVENTOR
Charles F. Watkins

UNITED STATES PATENT OFFICE.

CHARLES F. WATKINS, OF BUFFALO, NEW YORK.

BICYCLE.

SPECIFICATION forming part of Letters Patent No. 448,701, dated March 24, 1891.

Application filed September 22, 1890. Serial No. 365,861. (No model.)

*To all whom it may concern:*

Be it known that I, CHARLES F. WATKINS, a citizen of the United States, residing in Buffalo, in the county of Erie and State of New York, have invented certain new and useful Improvements in Bicycles; and the following is a description of the invention such as will enable others skilled in the art to which it appertains to make and use the same, reference being had to the accompanying drawing, and to letters of reference marked thereon, which forms a part of this specification.

My invention relates more particularly to the steering-fork of the Safety bicycle and its application to the guiding-wheel.

My object is to simplify construction and aid in relieving the jarring sensation to the rider when the wheel moves over obstacles, and at the same time have a firm device for turning the guiding-wheel.

In the drawing a repetition of the same letter indicates the same piece of mechanism, and any special portion of the same piece is noted by numbering its letter.

The figure shows a portion of the bicycle at its left side with my improvements.

The lower portion of the left prong of the steering-fork is shown at A A' A$^2$, and at G is the axle of the guiding-wheel of the bicycle, to which the piece B B' B$^2$ B$^3$ B$^4$ is fastened at B$^4$ by means of screw-thread and nut, or otherwise suitably fastened to the axle firm enough for guiding the wheel. It is not necessary to show the other prong of the steering-fork, as the two sides are alike.

The heel A$^2$ of the prong A is pivoted to work on the frame-piece B at B'. The toe end of the prong A' extends near the axle G and is acted upon by the spiral spring C. The upper end of the spring is clasped on a suitable projection on A'. The lower end of the spring is attached around the end of the adjusting-pin F at F', setting against the flange F$^2$.

B$^3$ is a projection on the frame-piece adapted to stop the end of the prong A' within the desired limit of action.

E is a piece of rubber set in a socket of the prong A', to touch the stop silently. The spring C should press the toe A' against the stop B$^3$ with a force desirable for holding the steering-fork in a backward position, and yet sufficiently yielding to allow the upper part of the fork to have a forward movement, either at the will of the rider or as the wheel is raised by moving over some obstruction suddenly. The degree of the spring's pressure may be changed by unscrewing the set-nut H and screwing the adjusting-pin F farther inward.

The spiral spring C may be about three inches in length, and the frame-piece B suitably proportioned, as indicated in the drawing.

When the steering-fork is operated and being pushed a little forward by the rider of the bicycle, the toe of the prong A' is pressed downward more or less on the spring. The pivot or bolt D is acted upon by the prong A as a bearing or fulcrum joint, and this joint should be a little lower than the axle G, and should be placed back of the end of the prong A', and the spring C should be located between the axle and this joint, all substantially as shown, to secure the most favorable conditions for easy action and relief from jarring motion.

What I claim, and desire to secure by Letters Patent of the United States, is—

1. In a bicycle having each of the two prongs of the steering-fork pinioned for its bearing on a frame at B' and the two-arm frame-piece attached to the axle G at B$^4$, the combination therewith of the spring C when connected at one of its ends rigidly to the arm of the frame at B$^2$, the projection at A' rigidly holding the other end of the spring C to the prong's end between the bearing at D on A$^2$ and axle G, the stop B$^3$, and the rubber E, all substantially as and for the purpose set forth.

2. In a Safety bicycle, the combination of the two-arm frame-piece B B' B$^2$ B$^3$ B$^4$, constructed as described, the improved adjusting-screw F F' F$^2$ when threaded into the lower end of the frame-piece B$^2$ and rigidly fastened by set-nut H and connecting the lower end of the spring C rigidly to the frame B and the projection on the prong at A' when rigidly holding the upper end of said spring with other parts of the steering device, when all are constructed and arranged adapting the end of the prong at A' to work free of frictional contact with any part or frame-piece between the axle G and the bearing of the prong at A$^2$ on the pinion D, all substantially as and for the purpose set forth.

3. As an improvement on my improvement in bicycles patented December 17, 1889, No. 417,655, the combination, with other parts, of steering device, the two-arm frame-piece B B' B² B³ B⁴, the improved adjusting-screw F F' F², threaded in the frame B², the set-nut H, the projection on the prong A', the rubber E, and the stop B³, when all are constructed and arranged adapting the spring C and end of the prong A' to be firmly held to operate free of any frictional contact with the frame or other part between axle G and the bearing of the prong at pinion D, all substantially as and for the purpose set forth.

CHARLES F. WATKINS.

Witnesses:
 CHARLES R. EDWARDS,
 CHARLES K. ROBINSON.